(12) United States Patent
Gonnet et al.

(10) Patent No.: US 11,046,608 B2
(45) Date of Patent: Jun. 29, 2021

(54) OPTICAL FIBER PREFORM AND METHOD FOR MANUFACTURING SUCH OPTICAL FIBER PREFORM FROM A PRIMARY PREFORM

(71) Applicant: DRAKA COMTEQ BV, Amsterdam (NL)

(72) Inventors: Cédric Gonnet, Paris (FR); Emmanuel Petitfrere, Villeneuve d'Ascq (FR); Laurent Calvo, Carvin (FR); Olivier Delwal, Orchies (FR)

(73) Assignee: DRAKA COMTEQ BV, Amsterdam (NL)

( * ) Notice: Subject to any disclaimer, the term of this patent is extended or adjusted under 35 U.S.C. 154(b) by 1166 days.

(21) Appl. No.: 14/911,522

(22) PCT Filed: Aug. 13, 2013

(86) PCT No.: PCT/IB2013/002235
§ 371 (c)(1),
(2) Date: Feb. 11, 2016

(87) PCT Pub. No.: WO2015/022562
PCT Pub. Date: Feb. 19, 2015

(65) Prior Publication Data
US 2016/0185649 A1    Jun. 30, 2016

(51) Int. Cl.
*C03C 13/04* (2006.01)
*C03C 25/1065* (2018.01)
(Continued)

(52) U.S. Cl.
CPC ...... *C03B 37/018* (2013.01); *C03B 37/01291* (2013.01); *C03C 3/06* (2013.01);
(Continued)

(58) Field of Classification Search
CPC ............ C03B 2201/03; C03B 2201/32; C03B 2201/50; C03B 2203/22; C03B 37/01291;
(Continued)

(56) References Cited

U.S. PATENT DOCUMENTS

| 5,063,179 A | * | 11/1991 | Menashi | ................ C01B 33/12 423/335 |
| 2005/0129603 A1 | * | 6/2005 | Szillat | .................... B82Y 30/00 423/335 |

(Continued)

FOREIGN PATENT DOCUMENTS

EP    1 700 832 A1    9/2006

OTHER PUBLICATIONS

International Search Report issued by the European Patent Office for PCT/IB2013/002235 dated Aug. 4, 2014.

*Primary Examiner* — Holly Rickman
*Assistant Examiner* — Lisa Chau
(74) *Attorney, Agent, or Firm* — Shumaker, Loop & Kendrick, LLP

(57) ABSTRACT

The invention relates to an optical fiber preform (20) comprising a primary preform (21) and one or more purified silica-based overclad layers (22) surrounding said primary preform (21), the purified silica-based overclad layers (22) comprising lithium and aluminium, and having a ratio between lithium concentration [Li] and aluminium concentration [Al] satisfying the following inequality:

$$1\times10^{-3}\leq[Li]/[Al]\leq20\times10^{-3}.$$

3 Claims, 2 Drawing Sheets

Figure 1:
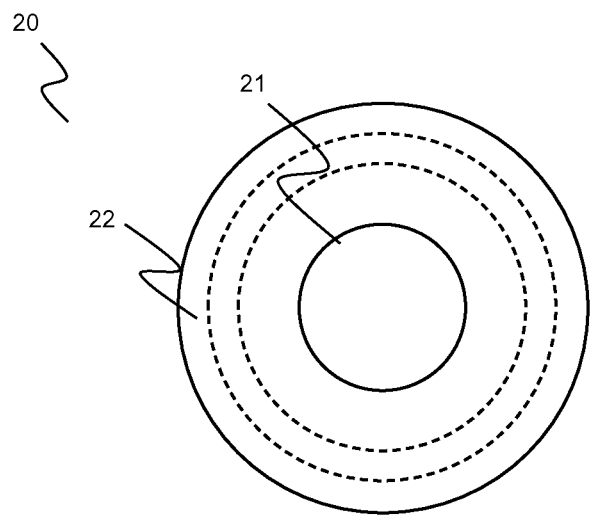

(51) Int. Cl.
*C03B 37/018* (2006.01)
*C03B 37/012* (2006.01)
*C03C 3/06* (2006.01)

(52) U.S. Cl.
CPC ........ *C03C 13/045* (2013.01); *C03C 25/1068* (2018.01); *C03B 2201/03* (2013.01); *C03B 2201/32* (2013.01); *C03B 2201/50* (2013.01); *C03B 2203/22* (2013.01); *C03C 2201/02* (2013.01); *C03C 2201/32* (2013.01); *C03C 2201/50* (2013.01)

(58) Field of Classification Search
CPC . C03B 37/018; C03C 13/045; C03C 2201/02; C03C 2201/32; C03C 2201/50; C03C 3/06; C03C 25/1068; C03C 25/1085
See application file for complete search history.

(56) References Cited

U.S. PATENT DOCUMENTS

2007/0295033 A1* 12/2007 Gonnet .................... H05H 1/30
                   65/391
2009/0053427 A1* 2/2009 Oswald .................. C03B 19/01
                   427/568

* cited by examiner

OPTICAL FIBER PREFORM AND METHOD FOR MANUFACTURING SUCH OPTICAL FIBER PREFORM FROM A PRIMARY PREFORM

1. FIELD OF THE INVENTION

The field of the invention is that of the design and manufacture of optical fibers.

The invention is applicable to the manufacture of optical fiber preforms, in particular for the manufacture of single-mode fibers.

The invention relates to an optical fiber preform and method for manufacturing such optical fiber preform from a primary preform.

The invention applies particularly to the technique of manufacture of optical fiber perform using plasma outside deposition.

2. TECHNOLOGICAL BACKGROUND

In a general manner, the steps of optical fiber fabrication include obtaining an primary preform (or core rod), overcladding the primary preform to form an optical fiber preform and drawing the optical fiber preform into a fiber.

There are a variety of methods currently used to manufacture preform for making optical fibers, like Vapor Axial Deposition (VAD) or Chemical Vapor Deposition (CVD) on the inside of a substrate tube to obtain a primary preform, followed by Outside Vapor Deposition (OVD), Advanced Plasma and Vapor Deposition (APVD), or sleeving with glass tubes for the overcladding.

In known manner, an primary preform can be obtained by chemical vapor deposition of doped and/or undoped silica glass layers inside a tube mounted on a glass working lathe, and which is after chemical vapor deposition subjected to a collapsing operation to form a solid primary preform (or core rod).

It is however advantageous to add material, generally natural or synthetic silica, to the outer circumference of the primary preform in order to increase its diameter and thus obtain, during fiber drawing, a continuous fiber that is several hundreds of kilometers long. This deposition operation also known as overcladding, or building-up operation, can be implemented by outside vapor deposition or advanced plasma and vapor deposition.

Advanced plasma and vapor deposition process consists in depositing silica powder through a plasma torch onto the primary preform (i.e. a glass core rod) and growing silica layer by layer. The primary preform is rod-shaped and is rotated around a rotation axis in front of the torch whose plasma is fed with grains of silica. The grains of silica are melted by means of the torch, then projected and vitrified onto the primary preform. The preform diameter obtained after deposition operation is a function of the number of silica layers coated on the primary preform.

The use of natural silica as raw material is leading to some drawbacks. Indeed natural silica, even if purified to extremely pure grades, still contains some traces of alkali elements such as lithium (Li) or sodium (Na) at the part per million (ppm) level or some traces of aluminum (Al).

If alkali elements are present in fiber glass structure, its attenuation can be degraded when it is put under an atmosphere containing hydrogen ($H_2$). Fiber sensitivity to exposure to hydrogen ($H_2$) is evaluated through accelerated ageing tests using high temperature (70° C. for example) and high pressure of hydrogen (10 bar for example) during a short period of time (72 hours for example). These tests enable to estimate fiber behavior after several tens of year of utilization under usual conditions. As a result of the exposure to hydrogen ($H_2$), Si—OH or Ge—OH chemical defects are appearing in the glass structure.

Such bonds are absorbent at certain wavelengths, thereby increasing the attenuation losses of the optical fiber at said wavelengths.

By alkali metals or alkali elements, it should be understood metals of the group I in the periodic table consisting of: lithium (Li), sodium (Na), potassium (K), rubidium (Rb), caesium (Cs), francium (Fr).

A known solution to decrease quantity of Alkali elements present in the silica layers deposited on the primary preform, as described in US patent documents U.S. Pat. No. 6,477,864 or 6,269,633, consists in purifying natural silica by introducing into the plasma (which is the seat of the chemical reaction) a fluorine (F) or chlorine (Cl) compound mixed with a carrier gas during the preform overcladding step. Lithium (Li) or sodium (Na) contained in the grains of silica reacts with the fluorine or chlorine compound, causing fluorides NaF or LiF or chlorides NaCl or LiCl to be given off in gaseous form. The purifying elements used can be $SF_6$-based gas (fluorine), $C_2F_6$-based gas (fluorine) $Cl_2$-based gas (chlorine).

While such a solution enables reducing the concentration of lithium (Li) or sodium (Na) in the deposited silica, however it does not give, for given operating conditions, sufficient stable fiber properties between different production batches of natural silica used for the deposition. This leads to a reproducibility problem of operations. Especially, for single-mode optical fibers obtained from that known technique, the attenuation measured at wavelength of 1550 nm (i.e. amount of light lost between input and output of the fiber) and durability against hydrogen ageing can be out of the desired range (specifications). A low concentration of Li or Na in the deposited silica improves durability against hydrogen ageing but degrades the attenuation of optical fiber. Such a known solution is therefore not optimal.

3. GOALS OF THE INVENTION

The invention, in at least one embodiment, is aimed especially at overcoming these different drawbacks of the prior art.

More specifically, it is a goal of at least one embodiment of the invention to provide an optical fiber preform that confers on the optical fiber obtained from said preform (before drawing) an adequate trade-off of optical characteristics.

It is another goal of at least one embodiment of the invention to provide an optical fiber preform that ensures both reduced fiber attenuation and good durability against hydrogen ageing.

It is another goal of at least one embodiment of the invention to provide a technique for manufacturing an optical fiber preform that is simple to manufacture and costs little.

It is another goal of at least one embodiment of the invention to provide a technique that guarantees an improved control of the process of purifying natural silica and that ensures the fiber specifications to be met.

4. SUMMARY OF THE INVENTION

A particular embodiment of the invention proposes an optical fiber preform comprising a primary preform and at least one purified silica-based overclad layer surrounding said primary preform, said at least one purified silica-based overclad layer comprising lithium and aluminium, and a ratio between lithium concentration [Li] and aluminium concentration [Al] satisfying the following inequality: $1\times10^{-3}\leq[Li]/[Al]\leq20\times10^{-3}$ The general principle is to propose an optical fiber preform that includes one or several purified silica-based overclad layers exhibiting a purification ratio playing both on lithium concentration and aluminium concentration. An optical fiber obtained from the optical fiber preform according to the invention offers an adequate trade-off of optical properties, particularly between fiber attenuation and durability against hydrogen ageing.

This approach is all the more surprising in that, for the person skilled in the art, the fact to play on the aluminium concentration should not have as much impact on the optical properties as expected. The inventors have discovered that aluminium and lithium (although not belonging to the same material family) are closely related. It has been observed that fiber attenuation decreases when the amount of lithium in the overclad layers grows and durability against hydrogen ageing is better with an aluminum contamination rather than an alkaline contamination.

Although the prior art solutions essentially lead to a reduction of alkali element contamination in the overclad layers, the present invention relies on a wholly novel and inventive approach taking advantage of a particular ratio between the lithium concentration and the concentration of aluminium, which does not belong to the alkali elements (group I in the periodic table).

According to a particular feature, the ratio between lithium concentration [Li] and aluminium concentration [Al] satisfies the following inequality:

$$4\times10^{-3}\leq[Li]/[Al]\leq10\times10^{-3}$$

The fiber attenuation is thus further reduced while keeping a good durability against hydrogen ageing.

According to a particular feature, the ratio between lithium concentration [Li] and aluminium concentration [Al] satisfies the following inequality:

$$4\times10^{-3}\leq[Li]/[Al]\leq6\times10^{-3}$$

The fiber attenuation is even more reduced while keeping a good durability against hydrogen ageing.

According to another particular embodiment, it is proposed an optical fiber made from the aforesaid optical fiber preform in any of its different implementation.

According to another particular embodiment, it is proposed a method for manufacturing an optical fiber preform from a primary preform, comprising the following steps:
  depositing at least one silica-based overclad layer on the primary preform by injection of a powder of natural silica into a plasma provided by a plasma source,
  injecting, into the plasma, a purifying gas intended to react with lithium,
said method being characterized in that it further comprises a step of adjusting at least one purifying gas injection parameter such that said at least one silica-based overclad layer deposited on the primary preform has a ratio between lithium concentration [Li] and aluminium concentration [Al] satisfying the following inequality:

$$1\times10^{-3}\leq[Li]/[Al]\leq20\times10^{-3}$$

Thus during the deposition step of natural silica on the primary preform, at least one purifying gas injection parameter is tuned to obtain an purified optical fibre preform that gives stable optical fiber proprieties, regardless the natural silica batches used for deposition.

The lithium contamination leads to decrease fiber attenuation although the aluminium contamination improves the durability against to hydrogen ageing. Thus, contrary to the prior art methods, the method according to the invention guarantees a better reproducibility and ensures a good trade-off between fiber attenuation and durability against hydrogen ageing.

According to a particular feature, the ratio between lithium concentration [Li] and aluminium concentration [Al] satisfies the following inequality:

$$4\times10^{-3}\leq[Li]/[Al]\leq10\times10^{-3}$$

According to a particular feature, wherein the ratio between lithium concentration [Li] and aluminium concentration [Al] satisfies the following inequality:

$$4\times10^{-3}\leq[Li]/[Al]\leq6\times10^{-3}$$

According to a particular feature, the method further comprises a step of controlling lithium concentration [Li] and aluminium concentration [Al] in said at least one silica-based overclad layer deposited on the primary preform, said step of adjusting at least one purifying gas injection parameter being carried out as a function of the result of said controlling step.

This step of controlling can be carried performed by means of a measurement sensor for example capable of measuring in real time the concentration of alkali elements contained in the silica layers deposited on the primary preform.

According to a particular feature, the method further comprises a step of injecting in the plasma a quantity of lithium adjusted as a function of the result of said controlling step.

The lithium contamination leads to decrease fiber attenuation. The quantity of lithium can be adjusted by means of a controlled injection of the purifying gas into the plasma (e.g. as a function of the purifying gas flow rate) so that the ratio satisfies at least one of the aforesaid above inequalities. This can be achieved by means of a dedicated additional injection duct or an addition of lithium in the raw silica.

According to a particular feature, the method further comprises a step of injecting in the plasma a quantity of aluminum adjusted as a function of the result of said controlling step.

The fact to play on the aluminium centration relative to the lithium concentration leads to a better control of optical characteristics of manufactured fibers. The aluminium contamination improves the durability against to hydrogen ageing.

According to a particular feature, said at least one purifying gas injection parameter comprises a purifying gas flow rate.

It is an easy and effective way to satisfy at least one of the aforesaid inequations.

Advantageously, said purifying gas flow rate is set between 0 and 5000 standard cubic centimeters per minute and more particularly between 0 and 800 standard cubic centimeters per minute.

According to a particular feature, said purifying gas belonging to the group comprising: $SF_6$, $C_2F_6$, $Cl_2$, $CF_4$, $NF_3$, $CF_3Cl$, $C_2Cl_3CF_3$.

It should be noted that this list is not exhaustive.

5. LIST OF FIGURES

Figure 2:
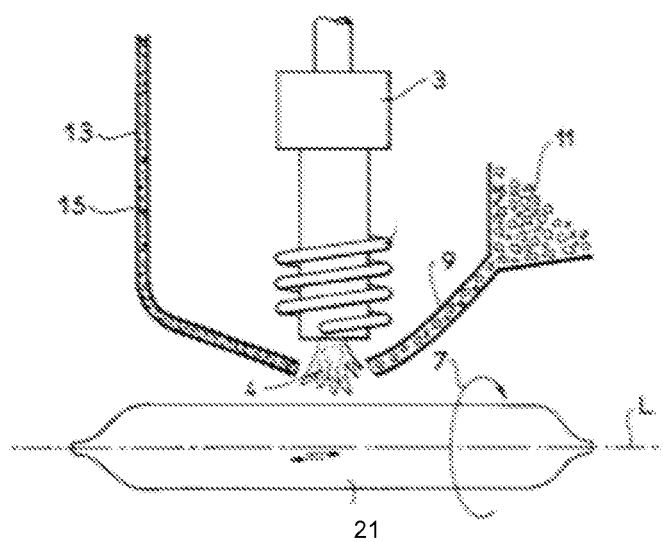
Figure 3:
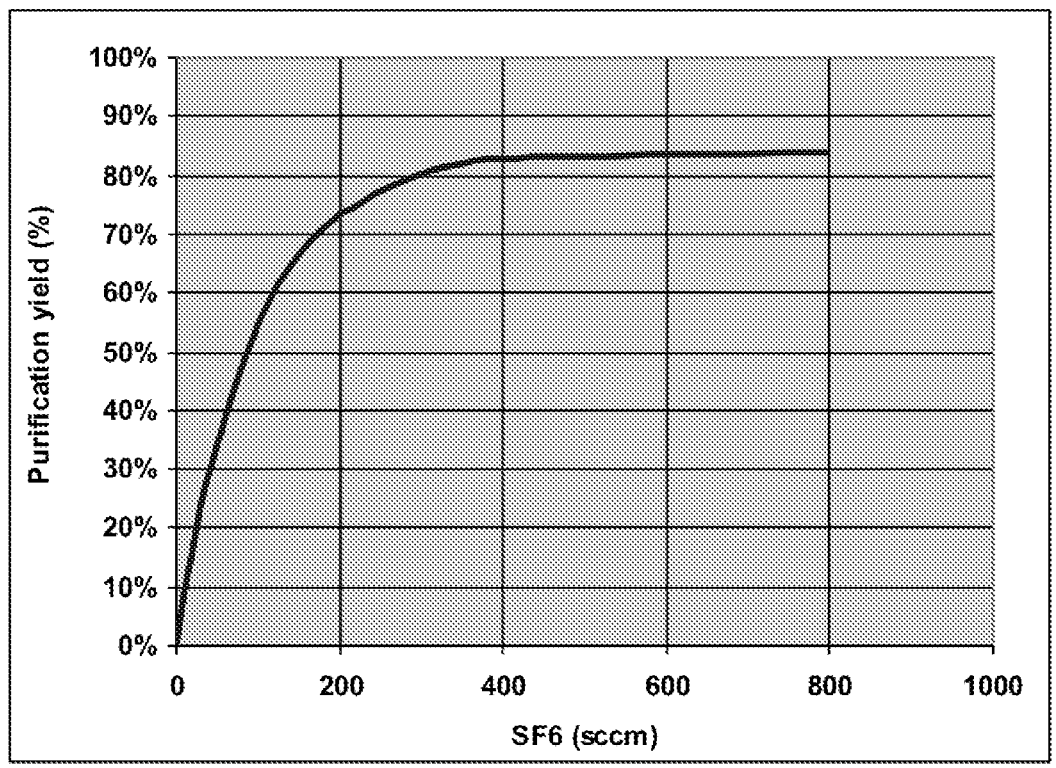
Figure 4:
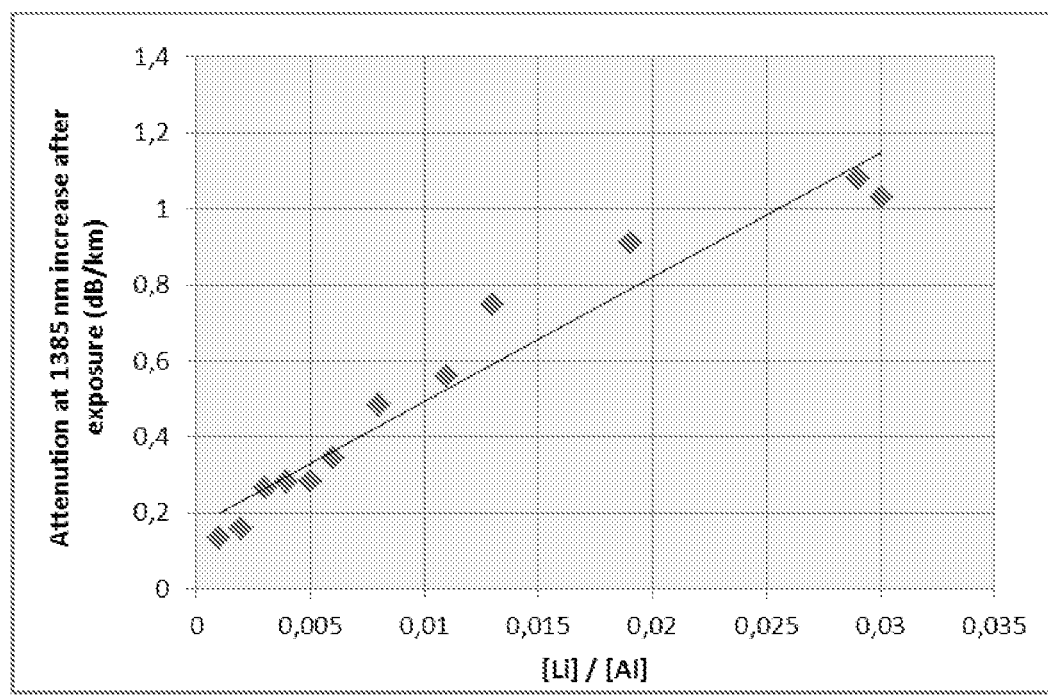

Other features and advantages of embodiments of the invention shall appear from the following description, given by way of an indicative and non-exhaustive examples and from the appended drawings, of which:

FIG. 1 provides a schematic illustration of an example of an optical fiber preform that has manufactured in application of the invention;

FIG. 2 provides a schema illustrating the implementation of a method of manufacturing an optical fiber preform according to a particular embodiment of the invention;

FIG. 3 graphically depicts a purification yield for alkali elements as a function of purifying compound flow rate;

FIG. 4 graphically depicts the ageing at a wavelength of 1385 nm of an optical fiber after being exposed under a pressure of 10 bar of pure hydrogen during 72 hours and at a temperature of 70° C., as a function of [Li]/[Al] ratio in an overclad material for G652d single-mode fiber.

6. DETAILED DESCRIPTION

In all of the figures of the present document, identical elements and steps are designated by the same numerical reference sign.

With reference to FIG. 1, there can be seen an example of an optical fiber preform 20 that has been overcladded in application of the invention. The optical fiber preform 20 illustrated here is ready to be draw into a fiber.

The optical fiber preform 20 comprises a primary preform 21 of rod-shaped and an overclad layer 22 surrounding said primary preform 21. The overclad layer 22 is a purified silica-based layer obtained by means of a method of purifying synthetic or natural silica implementing during the silica deposition operation on the primary preform 21. The principle of such a method is explained in greater detail below in relation with FIG. 2.

The deposition operation, also known as overcladding operation, serves to increase the diameter of the primary preform 21, to enable a fiber to be drawn therefrom that is several hundreds of kilometers long. The optical fiber preform 20 can comprise one or several overclad layers 22 (illustrated in dashed lines on FIG. 1).

The method of purifying silica according to the invention makes possible to deposit one or more layers of silica that contain an optimized amount of impurities (where the prior art only aims at minimizing amounts of alkali elements), so as to confer on the future optical fiber an adequate trade-off between fiber attenuation and good durability against hydrogen ageing.

The optical fiber preform 20 according to the invention comprises a purified silica-based overclad layer 22 having a ratio between lithium concentration [Li] and aluminium concentration [Al] comprised between $1\times10^{-3}$ and $20\times10^{-3}$. Concentrations are expressed in weight ppm. For example, the purified silica-based overclad layer 22 exhibits a purification ratio between lithium concentration and aluminium concentration of about $5\times10^{-3}$.

The inventors have discovered that, by depositing silica-based overclad layers 22 exhibiting a ratio between lithium concentration [Li] and aluminium concentration [Al] which is comprised between $1\times10^{-3}$ and $20\times10^{-3}$, more particularly between $4\times10^{-3}$ and $10\times10^{-3}$, and even more particularly between $4\times10^{-3}$ and $6\times10^{-3}$, the optical fiber preform thus obtained allows the future fiber (after drawing) to exhibit a good trade-off between attenuation at wavelength of 1550 nm and durability against hydrogen ageing and therefore to meet the required fiber specifications.

With reference to FIG. 2, there can be seen an example of implementation of the method of manufacturing according to the invention. The method aims at manufacturing an optical fiber preform 20 from a primary preform 21.

The method comprises a step of depositing several silica-based overclad layers 22 on the primary preform 21. This step consists in injecting a powder of synthetic or natural silica 11 into a plasma 4 provided by a plasma torch 3. The primary preform 21 extends along a longitudinal axis (referenced as L) and is set into rotation around said longitudinal axis L in the direction indicated by arrow 7. The preform is moving in a back-and-forth motion along said longitudinal axis in front of the plasma source 3 that provides the plasma 4 in front of the primary preform 21 substantially perpendicular to said longitudinal axis L. The step of depositing is carried out by means of an injection duct 9 which delivers grains of silica 11 into the plasma 4. These grains are the result, for example, of grinding up coarse blocks of natural quartz or of the extraction of quartz grain from granite stone using the proper purification process. The injection is here performed merely by gravity. A valve (not shown) cooperates with the injection duct 9 to allow the injection rate to be adjusted.

The method further comprises a step of purifying of the silica deposited on the primary preform 21. It consists in injecting, into the plasma 4, a purifying gas 15 containing, fluorine or chlorine element to neutralize alkali elements contained in the powder of silica which is depositing on the primary preform 21. This step is carried out by means of an injection duct 13 which feeds the plasma with the purifying gas 15. The purifying gas 15 is, for example, sulfur hexafluoride $SF_6$.

The deposition and purifying steps are carried out as the primary 21 preform is rotating and moving in front of the plasma plume.

The method further comprises a step of adjusting the purifying gas flow such that the silica-based overclad layer 22 which are depositing on the primary preform 21 have a ratio between lithium concentration [Li] and aluminium concentration [Al] satisfying the following inequality:

$$1\times10^{-3}\leq[Li]/[Al]\leq20\times10^{-3} \quad (1)$$

In the present example, the purified silica-based overclad layer 2 exhibits a purification ratio of about $5\times10^{-3}$.

A valve (not shown) is connected to a gas supply (not shown) cooperating with the injection duct 13 to adjust the purifying gas flow rate. It defines the $SF_6$ fluorine flow rate.

By way of example, the silica flow rate is set between 0.5 and 6 Kg/hour, with grain average size between 50 and 400 µm. The Plasma power is set between 60 and 140 KW. The SF6 flow rate is set between 0 and 1000 sccm. The core rod is translated at a rate of 5 to 80 mm/min in front of the plasma flame.

In the plasma, the chemical reactions between the silica grains and the fluorine $SF_6$ occur. The temperature of the plasma lies in the range 5 000° C. to 10 000° C., causing the silica grains to melt.

The fluorine $SF_6$ reacts with the alkali elements that are present in the natural silica so as to neutralize so that the overclad layers meeting to the above criteria.

For a given reaction temperature and a given silica flow rate, the $SF_6$ flow rate can be adjusted to obtain the desired lithium and aluminium concentration in the overclad layers (i.e. after purification), which depends content of lithium and aluminium contained in the raw silica batch (before i.e. purification).

It is possible to tune one of these purifying gas injection parameters or a combination of these parameters to satisfy the aforesaid inequation (1).

Overclad's contamination in alkali elements can be expressed by that $[alkali]_{after\ purification} = \alpha \cdot [alkali]_{before\ purification}$, with $\alpha$ a parameter which is function of the purifying gas flow rate.

FIG. 3 graphically depicts the purification yield (1− $[Alkali]_{after\ purification}$)/$[Alkali]_{before\ purification}$ as a function of $SF_6$ flow rate, for given APVD conditions. The curve shows that, when SF6 flow rate is chosen between 0 and 800 sccm ("standard cubic centimeters per minute"), purification yield ranges between 0% and 85%. Lithium contamination in preform's overclad can be set at the required target by choosing the right flow. More generally, SF6 flow rate can be set between 0 and 5000 sccm.

|  | Al (ppm) | Li (ppm) | Gas flow rate (sccm) | [Li]/[Al] in overclad | Attenuation at 1550 nm (dB/km) | Ageing* (dB/km) |
|---|---|---|---|---|---|---|
| Trial1 | 14 | 0.4 | 800 | 0.004 | 0.194 | 0.30 |
| Trial2 | 14 | 0.4 | 200 | 0.008 | 0.190 | 0.43 |
| Trial3 | 7 | 0.2 | 250 | 0.007 | 0.190 | 0.40 |
| Trial4 | 7 | 0.04 | 800 | 0.003 | 0.200 | 0.26 |

*Ageing measured at wavelength of 1385 nm, temperature of 70° C., during 72 H for a pressre of 10 bar.

FIG. 4 depicts the ageing at a wavelength of 1385 nm measured after an exposure of an optical fiber under a pressure of 10 bar of pure hydrogen during 72 hours and at a temperature of 70° C., as a function of [Li]/[Al] ratio in the overclad material for G652d single-mode fiber.

From that table, it should be noticed that the claimed ranges of purification ratio guarantee that a good trade-off between attenuation and hydrogen ageing. Indeed, if the ratio is chosen between 0.004 and 0.010, then attenuation at a wavelength of 1550 nm, for G652d preform type with usual draw configuration, is lower than 0.19 dB/km while keeping a reasonable resistance of fibers when exposed to an hydrogen atmosphere (between 0.2 and 0.6). The degradation under a pressure of 10 bar of pure hydrogen at a temperature of 70° C. will not exceed 0.6 dB/km at 1385 nm.

If the ratio is chosen between 0.004 and 0.010, attenuation at wavelengths of 1310 nm and 1550 nm, for G652d preform type with usual draw configuration, are lower than 0.32 and 0.19 dB/km respectively while keeping a reasonable resistance of fibers when exposed to an hydrogen atmosphere. The degradation under a pressure of 10 bar of pure hydrogen at a temperature of 70'C will not exceed 0.6 dB/km at 1385 nm after 72 hours.

In a variant of embodiment, the quantity of aluminum can be adjusted in the raw natural silica prior deposition, using an adequate procedure, in order to satisfy the targeted range of lithium and aluminum concentrations. This variant is of particular interest in case of highly contaminated silica that can't be purified during the overclad step down to satisfying purities. In this variant a purifying gas injected in the plasma through duct 13 could also be used.

According to a particular embodiment, the method further comprises a step of controlling lithium concentration [Li] and aluminium concentration [Al] in real time of the silica-based overclad layers 22 deposited on the primary preform 21. Then, the step of adjusting the carrier gas injection parameters is carried out as a function of the result of said controlling step.

Although the present disclosure has been described with reference to one or more examples, workers skilled in the art will recognize that changes may be made in form and detail without departing from the scope of the disclosure and/or the appended claims.

The invention claimed is:

1. An optical fiber preform comprising a primary preform and at least one purified silica-based overclad layer surrounding the primary preform, the at least one purified silica-based overclad layer comprising lithium and aluminium, wherein the at least one purified silica-based overclad layer has a ratio between lithium concentration [Li] and aluminium concentration [Al] satisfying the following inequality:

$4 \times 10^{-3} \leq [Li]/[Al] \leq 10 \times 10^{-3}.$

2. The optical fiber preform according to claim 1, wherein the ratio between lithium concentration [Li] and aluminium concentration [Al] satisfies the following inequality:

$4 \times 10^{-3} \leq [Li]/[Al] \leq 6 \times 10^{-3}.$

3. An optical fiber made from the optical fiber preform according to claim 1.

* * * * *